_____

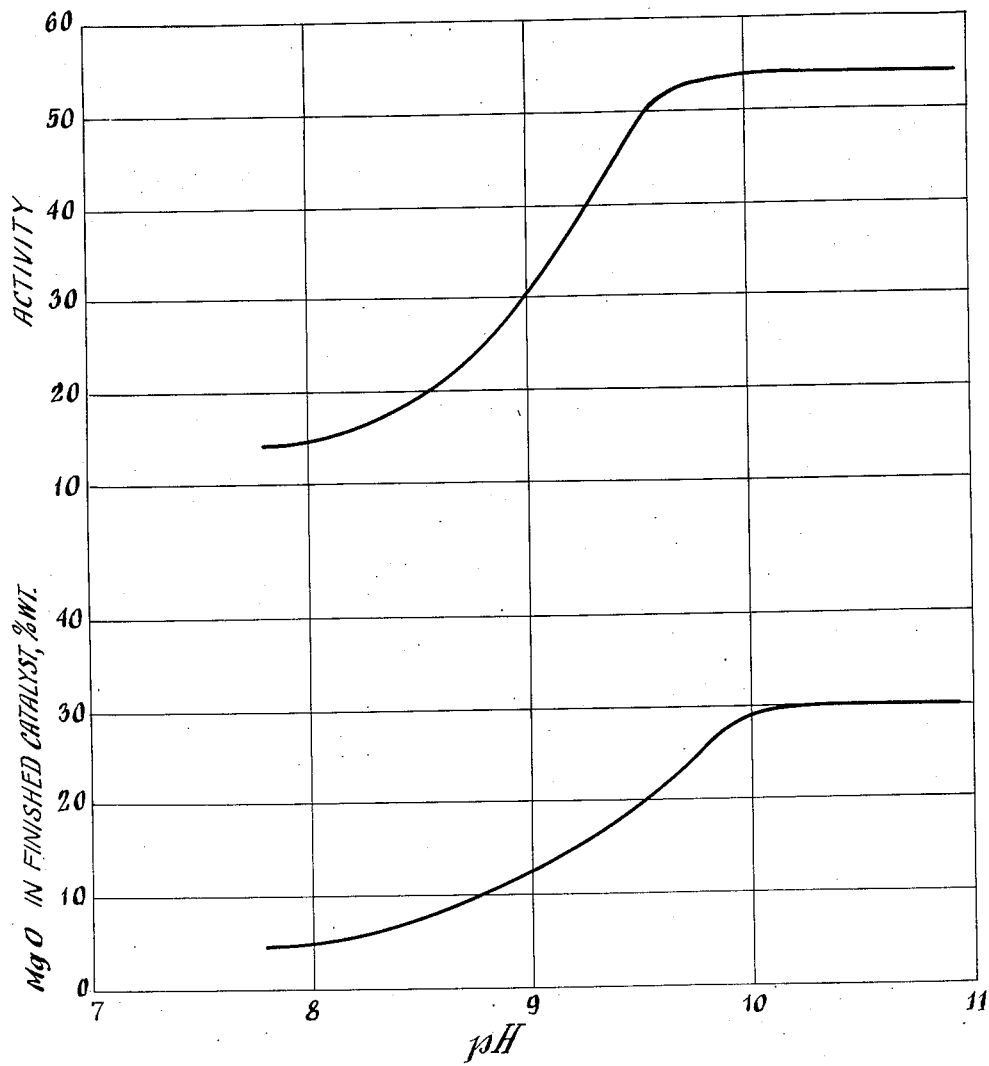

2,796,409

SILICA-MAGNESIA CATALYST PREPARATION

Albert B. Schwartz, Philadelphia, Pa., assignor to Socony Mobil Oil Company, Inc., a corporation of New York Application February 15, 1952, Serial No. 271,747

8 Claims. (Cl. 252—448)

This invention relates to an improved process for the manufacture of a silica-magnesia catalyst. More particularly, the present invention is concerned with the production of silica-magnesia gel composites useful in catalytically promoting the conversion of hydrocarbons.

Composites of silica and magnesia have heretofore been employed in catalytic reforming of petroleum hydrocarbons boiling in the gasoline range to improve the antiknock characteristics thereof, in promoting alkylation, isomerization, polymerization and desulfurization of hydrocarbons as well as in the treatment of various other compounds, for example, in catalyzing the dehydration of alcohols. Silica-magnesia catalysts are especially useful in promoting the cracking of higher boiling oils to yield gasoline since a better product distribution is thereby attained as compared with that obtainable with the use of other conventional cracking catalysts. The product distribution achieved with silica-magnesia catalysts is desirable in affording higher gasoline yields and lower production of coke and gaseous products.

Silica-magnesia catalysts have heretofore been prepared by various methods. One process has involved preparation of a silica hydrogel by acidification of a silicate. The hydrogel is thereafter water-washed and mixed with an aqueous slurry of magnesia by passage of the mixture through a ball mill, colloid mill or similar apparatus, after which the resulting composite is aged, dried, and calcined. Another procedure which has been used for preparation of a silica-magnesia catalyst is to impregnate a preformed silica hydrogel with a magnesium salt, such as magnesium sulfate, and to treat the impregnated hydrogel with ammonia to precipitate magnesia. Still another method of preparing a silica-magnesia catalyst entails the introduction of a magnesium salt, such as magnesium sulfate solution, into a silica hydrosol before gelation, allowing the resulting sol to set, treating the hydrogel so obtained with ammonia to precipitate magnesia, and washing, drying, and calcining the catalyst product. Another method for producing silica-magnesia composites is to add magnesia as a slurry in water to an acidic silica hydrosol, allow the resulting sol to set to a hydrogel, followed by water-washing, drying, and calcining of the hydrogel.

These known methods for preparing silica-magnesia catalytic composites have been cumbersome, time-consuming, wasteful of initial reagents and, further, often lead to products having poor heat stability and low mechanical strength. For example, the procedures involving ammoniation generally require a considerable period of time, i. e., 8 to 10 hours, to insure thorough magnesia precipitation and in addition entail a health hazard created by the use of large quantities of ammonia. The method involving admixture of magnesia and an acidic silica hydrosol has the disadvantage that a portion of the magnesia is consumed in neutralizing acid present and the resulting magnesium salt, which is water-soluble, becomes lost by dissolution during the subsequent water-washing step.

It is a major object of this invention to overcome the aforesaid disadvantages accompanying previously employed methods for preparing silica-magnesia catalyst. A further object is the provision of an efficient process for producing silica-magnesia hydrogel in the form of bead-like spheroidal particles. A still further object is to provide a method for preparing silica-magnesia catalyst under conditions wherein substantially all of the initial magnesium reagent employed is contained in the final product.

The above and other objects which will be apparent to those skilled in the art are achieved in accordance with the process of the present invention. Broadly stated, the present invention comprises a method for preparing a silica-magnesia catalyst by simultaneous mixing of three separate reagent streams, namely, (1) an acidic stream, (2) an alkali metal silicate stream, and (3) a stream of an aqueous suspension of magnesia or magnesium compound, which will give magnesia on decomposition. The three streams are combined to yield an alkaline hydrosol, the maximum acid being such as to substantially neutralize the alkali metal silicate but insufficient to form the magnesium salt of the acid employed. In general, the hydrosol and the hydrogel obtained upon gelation have a pH in the range of 8 to 11. The resulting hydrogel is thereafter base-exchanged to remove zeolitic alkali metal, water-washed, dried, and calcined.

One embodiment of the invention comprises simultaneous mixing of three separate reagent streams of acid, alkali metal silicate, and aqueous slurry of magnesia under conditions of pH control such that the resulting hydrogel has a pH in the range of 8 to 11 and the minimum pH is further defined by the expression:

$$pH = \frac{6500 - t}{560}$$

where $t$ is the temperature of calcination of the magnesia reagent in degrees Fahrenheit, said temperature of calcination being between 800 and 2000° F. Another embodiment of the invention involves the simultaneous contacting under the above controlled conditions of pH of three streams wherein the magnesia stream is further characterized by the suspension therein of finely pulverized silica-magnesia gel. The resultant catalysts exhibit improved regeneration characteristics, as hereinafter shown, over the catalysts in which such pulverized silica-magnesia gel is absent.

The process of this invention may be carried out on a batch, semi-batch, or continuous basis. Thus, the hydrosol formed upon contacting the three reagent streams as aforesaid may be conducted into setting tubs and allowed to remain therein for a sufficient time to effect gelation, after which the resulting hydrogel is removed, broken up into pieces of desired size, base-exchanged, and washed to remove soluble material therefrom. The washed hydrogel is thereafter dried and activated for use as a catalyst. The instant process has been found to be particularly useful for the production of silica-magnesia catalyst in the form of spheroidal particles. The hydrosol produced in accordance with this invention may be formed into spheroidal particles by any feasible process, such as the methods described in patents to Marisic, for example, U. S. 2,384,946. Broadly, such methods involve flowing the hydrosol over a dividing cone to separate the same into a plurality of streams and admitting each of said streams into a column of water-immiscible liquid, for example, an oil medium, wherein the globules of hydrosol set to hydrogel and subsequently pass into an underlying layer of water from which they are sluiced to further processing operations, such as hydrothermal threatment, base-exchange, water-washing, drying, and calcining.

It has heretofore been recognized where silica-magnesia gel composites are to be employed in catalytically promoting the cracking of higher boiling oils to materials boiling in the range of gasoline that the magnesia content of the composite should preferably be between about 20 and about 40 percent by weight. Generally, optimum catalytic activity has been observed with a catalyst containing about 30 percent by weight of magnesia. Thus, typical cracking data utilizing silica-magnesia catalysts of varying magnesia content gave the following results:

| MgO Content, Percent Wt. | CAT-A Activity | |
| --- | --- | --- |
| | 410° F., E. P. Gasoline, Percent Vol. | Coke, Percent Wt. |
| 15.6 | 35.6 | 3.0 |
| 19.6 | 46.0 | 4.7 |
| 23.6 | 49.1 | 5.4 |
| 27.2 | 53.2 | 6.7 |
| 30.7 | 53.4 | 7.7 |
| 35.7 | 50.5 | 7.4 |
| 37.6 | 49.8 | 7.5 |

It is apparent from the foregoing data that catalysts of decreasing magnesia content below the optimum afford less catalytic conversion to gasoline.

In previous methods of preparing silica-magnesia catalysts wherein an acidic hydrosol was formed, a portion of the magnesia or equivalent magnesium compound was converted to the magnesium salt of the acid employed which, being water-soluble, was subsequently removed during washing of the formed hydrogel. Such procedures have not only been wasteful of the magnesium reagent but, due to the deceased magnesia content of the resulting washed composite, have resulted in catalysts of decreased activity and consequently have necessitated the use of excess quantities of magnesium reagent over and above that contained in the resultant washed composite in order that the final catalyst may have the desired activity. By following the method of the present invention, it has been found, upon simultaneously combining three separate reagent streams and controlling the pH of the resulting hydrosol in the range of 8 to 11, that an improved and efficient process is achieved with no appreciable loss of magnesium reagent when the resulting hydrogel is washed, since substantially all of the initial magnesia or equivalent compound employed is contained in the final catalyst.

The magnesium compound used in the present process may comprise magnesia or any decomposable compound of magnesium which will give magnesia on decomposition. Suitable decomposable magnesium compounds are, for example, magnesium hydroxide, magnesium carbonate and basic magnesium carbonate. Under certain conditions, particularly where high catalyst regeneration characteristics are desired, it is desirable to include a minor proportion, generally between about 10 and about 30 percent by weight of the final catalyst of finely pulverized silica-magnesia gel having a particle size of less than 50 microns. The acid employed may be any of the acids heretofore used in inorganic oxide hydrogel preparation, including acid salts, such as ammonium sulfate and ammonium chloride. In general, however, it is preferred to use inorganic mineral acids and, in particular, sulfuric acid. The alkali metal silicate used is generally sodium silicate, although it is contemplated that other silicates of the alkali metals may be likewise employed.

The three reagent streams of acid, alkali metal silicate, and magnesia or equivalent compound are simultaneously contacted in accordance with the present process in a mixing nozzle under conditions of rapid flow, affording intimate admixture thereof with resultant formation of a hydrosol. The three streams are combined to yield an alkaline hydrosol and the resultant hydrogel obtained upon setting of said sol is characterized by a pH in the range of 8 to 11.

The hydrogel so obtained may, if desired, be initially subjected to a hydrothermal treatment to improve the reaction between the magnesia and silica components. Such treatment, however, is not considered essential to success of the present process. The hydrogel is thereafter water-washed to remove soluble material. In those instances where it is desirable to remove zeolitic alkali metal introduced into the hydrogel through the use of the alkali metal silicate, the hydrogel may be base-exchanged with an aqueous magnesium salt solution before water-washing. If desired, the hydrogel may be base-exchanged with an ammonium salt or the salt of a metal other than magnesium which is capable of replacing zeolitic alkali metal. By using a base exchange solution of a metal salt other than one of magnesium, it is possible to introduce a second metal into the hydrogel composite and to thus afford a resulting catalyst containing silica, magnesia, and the oxide of a second metal, the salt of which was employed in the base exchange solution. For example, the hydrogel containing zeolitic alkali metal may be base-exchanged with an aluminum salt solution, such as aqueous aluminum sulfate, and the resulting base exchanged composite would be a silica-magnesia-alumina catalyst. In such manner, it is possible to prepare silica-magnesia combinations containing one or more oxides of other metals, such as manganese, zirconium, beryllium, zinc, copper, titanium, cadmium, chromium, and iron. The incorporation of such additional metal oxide into the catalyst may be found desirable under the particular conditions or use to which the resulting catalyst is subjected.

After washing, the catalyst is preferably dried at a temperature generally in the range of about 150 to about 400° F. and when desired the catalyst may be calcined at a temperature of from about 1150 to 1300° F. for a period of about 1 hour or more.

The following examples will serve to illustrate the method of the present invention without limiting the same:

EXAMPLE 1

Three separate reagent streams, comprising magnesia, sodium silicate, and sulfuric acid, were simultaneously mixed in a mixing nozzle. The magnesia stream was composed of 13 pounds of medium calcined magnesia slurried in 181 pounds of water. The sodium silicate stream was composed of 105 pounds of sodium silicate having an $Na_2O$ to $SiO_2$ ratio of 1:3.22 and 105 pounds of water. The sulfuric acid stream was composed of 17.4 pounds of 96.3% sulfuric acid and 127 pounds of water. The three streams were mixed under the following conditions:

|  | Cc./min. |
| --- | --- |
| Acid solution rate | 265 |
| Silicate solution rate | 400 |
| Magnesia suspension rate | 500 |

The resulting hydrosol was allowed to flow over a dividing cone into an oil medium contained in conventional bead-forming equipment such as described in the aforementioned Marisic patent. The time of gelation of the above-prepared hydrosol was 4.5 seconds at 84° F. The resulting hydrogel had a pH of 9.8. The resulting hydrogel particles were treated for 6 hours at 160° F. while covered with water, after which the hydrogel particles were base-exchanged with a magnesium sulfate solution, washed free of soluble salts, dried in superheated steam at 265° F., and calcined for 3 hours at 1300° F.

The resulting silica-magnesia gel, upon testing in the standard Cat-A activity test, gave the following results:

| | |
| --- | --- |
| 410° F., E. P. gasoline, percent vol | 53.2 |
| Coke, percent wt | 6.7 |
| Gas, percent wt | 6.8 |
| Gas gravity | 1.30 |

EXAMPLE 2

Three reagent streams, comprising heavy calcined magnesia, sodium silicate, and sulfuric acid, were simultaneously mixed in a mixing nozzle. The magnesia stream was composed of 13 pounds of magnesia slurried in 90.5 pounds of water, together with 3.45 pounds of sodium hydroxide, to aid in dispersion of the magnesia. The sodium silicate stream was composed of 105 pounds of sodium silicate having an $Na_2O$ to $SiO_2$ ratio of 1:3.22 and 105 pounds of water. The acid stream was composed of 22.0 pounds of 96.3% sulfuric acid and 127 pounds of water. The three streams were mixed under the following conditions:

|  | Cc./min. |
|---|---|
| Acid solution rate | 220 |
| Silicate solution rate | 385 |
| Magnesia suspension rate | 210 |

The resulting hydrosol set to a hydrogel in 1.5 seconds at 94° F. The hydrogel so obtained had a pH of 10.1. The hydrogel was processed as described in Example 1 and, upon testing in the Cat-A activity test, gave the following results:

| 410° F., E. P. gasoline, percent vol | 44.8 |
|---|---|
| Coke, percent wt | 4.6 |
| Gas, percent wt | 4.8 |
| Gas gravity | 1.19 |

EXAMPLE 3

Three reagent streams of magnesium carbonate, sodium silicate, and sulfuric acid were simultaneously mixed in a mixing nozzle. The magnesium carbonate stream was composed of 27.2 pounds of magnesium carbonate slurried in 181 pounds of water. The sodium silicate stream was composed of 105 pounds of sodium silicate having an $Na_2O$ to $SiO_2$ ratio of 1:3.22 and 105 pounds of water. The acid stream was composed of 17.4 pounds of 96.3% sulfuric acid and 127 pounds of water. The three streams were mixed under the following conditions:

|  | Cc./min. |
|---|---|
| Acid solution rate | 285 |
| Silicate solution rate | 380 |
| Magnesium carbonate suspension rate | 430 |

The resulting hydrosol set to a hydrogel in 4.8 seconds at 83° F. The hydrogel so obtained had a pH of 9.1. The hydrogel particles were processed as described in Example 1. The resulting catalyst was tested in the Cat-A activity test and gave the following results:

| 410° F., E. P. gasoline, percent vol | 38.0 |
|---|---|
| Coke, percent wt | 2.9 |
| Gas, percent wt | 3.5 |
| Gas gravity | 1.08 |

EXAMPLE 4

Three reagent streams of magnesium hydroxide, sodium silicate, and sulfuric acid were simultaneously mixed in a mixing nozzle. The magnesium hydroxide stream was composed of 18.8 pounds of magnesium hydroxide slurried in 175 pounds of water. The sodium silicate stream was composed of 105 pounds of sodium silicate having an $Na_2O$ to $SiO_2$ ratio of 1:3.22 and 105 pounds of water. The acid stream was composed of 17.4 pounds of 96.3% sulfuric acid and 127 pounds of water. The three streams were mixed under the following conditions:

|  | Cc./min. |
|---|---|
| Acid solution rate | 228 |
| Silicate solution rate | 346 |
| Magnesium hydroxide suspension rate | 530 |

The time of gelation of the resulting hydrosol was 3.7 seconds at 66° F. The hydrogel so obtained had a pH of 9.4. The hydrogel was processed as described in Example 1 and, upon testing in the Cat-A activity test, gave the following results:

| 410° F., E. P. gasoline, percent vol | 40.1 |
|---|---|
| Coke, percent wt | 3.4 |
| Gas, percent wt | 3.1 |
| Gas gravity | 1.26 |

EXAMPLE 5

Three reagent streams of magnesia, sodium silicate, and sulfuric acid were simultaneously mixed in a mixing nozzle. The magnesia stream was composed of 13 pounds of medium calcined magnesia, 10.8 pounds of pulverized dried silica-magnesia gel containing about 25% by weight magnesia and 181 pounds of water. The sodium silicate stream was composed of 105 pounds of sodium silicate having an $Na_2O$ to $SiO_2$ ratio of 1:3.22 and 105 pounds of water. The acid stream was composed of 17.4 pounds of 96.3% sulfuric acid and 127 pounds of water. The streams were mixed under the following conditions:

|  | Cc./min. |
|---|---|
| Acid solution rate | 265 |
| Silicate solution rate | 400 |
| Magnesia and silica-magnesia suspension rate | 425 |

The time of gelation of the resulting hydrosol was 6.8 seconds at 83° F. The hydrogel so obtained had a pH of 9.8. The hydrogel particles were processed as described in Example 1. The final catalyst exhibited improved regenerability since the time to burn off 85% of an initial carbon deposit of 22 grams per liter of catalyst was 18 minutes for this catalyst as compared to a burning time of 101 to 114 minutes under identical conditions for silica-magnesia catalyst in which the pulverized silica-magnesia gel reagent was omitted. The catalyst, upon testing in the Cat-A activity test, gave the following results:

| 410° F., E. P. gasoline, percent vol. | 53.1 |
|---|---|
| Coke, percent wt. | 5.3 |
| Gas, percent wt. | 5.8 |
| Gas gravity | 1.31 |

EXAMPLE 6

Three reagent streams of magnesia, sodium silicate, and sulfuric acid were simultaneously mixed in a mixing nozzle. The magnesia stream was composed of 13 pounds of medium calcined magnesia and 181 pounds of water, together with 3.45 pounds of sodium hydroxide to aid in dispersion of the magnesia. The sodium silicate stream was composed of 105 pounds of sodium silicate having an $Na_2O$ to $SiO_2$ ratio of 1:3.22 and 105 pounds of water. The acid stream was composed of 21.5 pounds of 96.3% sulfuric acid and 127 pounds of water. The three streams were mixed under the following conditions:

|  | Cc./min |
|---|---|
| Acid solution rate | 208 |
| Silicate solution rate | 385 |
| Magnesia suspension rate | 398 |

The time of gelation of the resulting hydrosol was 5 seconds at 77° F. The pH of the resulting hydrogel was 10.1. After forming bead hydrogel as described in Example 1, the hydrogel was immediately base-exchanged with magnesium sulfate solution, washed free of soluble salts, dried in superheated steam at 265° F. and heated for 3 hours at 1300° F. The resulting catalyst, upon testing in the Cat-A activity test, gave the following results:

| 410° F., E. P. gasoline, percent vol. | 48.8 |
|---|---|
| Coke, percent wt. | 7.2 |
| Gas, percent wt. | 7.1 |
| Gas gravity | 1.33 |

EXAMPLE 7

Three reagent streams of magnesia, sodium silicate, and ammonium sulfate were simultaneously mixed in a mixing nozzle. The magnesia stream was composed of 13 pounds of medium calcined magnesia and 181 pounds of water. The sodium silicate stream was composed of 105 pounds of sodium silicate having an $Na_2O$ to $SiO_2$ ratio of 1:3.22 and 105 pounds of water. The acidic stream was composed of 22.7 pounds of ammonium sulfate and 128 pounds of water. The three streams were mixed under the following conditions:

|  | Cc./min. |
|---|---|
| Ammonium sulfate solution rate | 270 |
| Silicate solution rate | 400 |
| Magnesia suspension rate | 500 |

The time of gelation of the resulting hydrosol was 7.3 seconds at 85° F. The hydrogel so obtained had a pH of 10.2. The hydrogel was processed as described in Example 1 and upon testing in the Cat-A activity test gave the following results:

| 410° F., E. P. gasoline, percent vol. | 47.0 |
|---|---|
| Coke, percent wt. | 6.3 |
| Gas, percent wt. | 6.8 |
| Gas gravity | 1.41 |

The effects of hydrogel pH on the amount of magnesia retained in the finished catalyst and the activity of the resulting catalyst are shown by the results of Examples 8 to 13 set forth in Tables I and II. In these examples, the sodium silicate solution employed was composed of 105 pounds of sodium silicate having an Na₂O to SiO₂ ratio of 1:3.22 and 105 pounds of water. The acid solution employed in Examples 8 to 10 was composed of 17.4 pounds of 96.3% sulfuric acid and 127 pounds of water. The acid solution employed in Examples 11 to 13 was composed of 34.8 pounds of 96.3% sulfuric acid and 127 pounds of water. The magnesia suspension employed in Examples 8 to 12 was composed of 13 pounds of magnesia which had been calcined at 1400° F. and 181 pounds of water. The magnesia suspension employed in Example 13 was composed of 5.36 pounds of magnesia which had been calcined at 1400° F. and 50 pounds of water.

The silicate, acid, and magnesia suspension streams were simultaneously mixed in a mixing nozzle at the rates and temperatures shown in Table I to produce a silica-magnesia hydrosol. The hydrosol was conducted over a dividing cone into an oil medium in which it set to hydrogel spheroidal particles. The resulting particles passed into an underlying water layer from which they were sluiced for further processing. Such processing involved treatment of the hydrogel particles for 6 hours at 160° F. while covered with water. The hydrogel was then base-exchanged with a magnesium sulfate solution, washed free of soluble salts, dried in superheated steam at a temperature of 280° F. and then heated for 3 hours at 1300° F. The magnesia content of the finished catalyst and the results of the Cat-A activity test are set forth in Table II.

*Table II*

| Example | Percent MgO | App. Dens., g./cc. | CAT-A Activity |  |  |  |
|---|---|---|---|---|---|---|
|  |  |  | 410° F. E. P. Gasoline, Percent Vol. | Coke, Percent Wt. | Gas, Percent Wt. | Gas Gr. |
| 8 | 26.2 | 1.04 | 53.8 | 8.3 | 7.9 | 1.46 |
| 9 | 31.4 | 1.05 | 54.7 | 8.2 | 7.9 | 1.51 |
| 10 | 25.3 | 0.91 | 51.4 | 6.8 | 7.6 | 1.32 |
| 11 | 5.6 | 0.47 | 15.6 | 0.9 | 1.4 | 0.85 |
| 12 | 9.3 | 0.58 | 24.1 | 1.6 | 2.2 | 1.00 |
| 13 | 5.6 | 0.49 | 19.2 | 1.1 | 1.6 | 0.81 | the catalyst decreases with decreasing magnesia content for a catalyst containing about 30% by weight or less magnesia.

It is evident from the foregoing that the most desirable pH range for forming silica-magnesia hydrogel prepared from magnesia calcined at about 1400° F. is about 9.5 to about 11. The minimum pH within the range of 8 to 11 at which hydrogels of similar composition, but prepared with magnesia calcined at varying temperatures, are preferably prepared is defined by the relationship:

$$pH = \frac{6500 - t}{560}$$

where $t$ is the temperature of calcination of magnesia in degrees Fahrenheit. For example, silica-magnesia hydrogels containing 34% by weight magnesia and prepared from magnesia calcined at varying temperatures were formed under the following preferred minimum pH values:

| Magnesia calcining temperature: | Hydrogel pH |
|---|---|
| 1100° F | 9.6 |
| 1400° F | 9.3 |
| 1700° F | 8.8 |
| 2000° F | 8.0 |

It is to be understood that the above description is merely illustrative of preferred embodiments of the invention, of which many variations may be made within the scope of the following claims by those skilled in the art without departing from the spirit thereof.

I claim:

1. A method for preparing a silica-magnesia catalyst, comprising simultaneously combining three separate streams of (1) an acid solution, (2) an alkali metal silicate solution, and (3) an aqueous suspension of calcined magnesia to yield an alkaline hydrosol having a pH in

*Table I*

| Example | Acid |  | Magnesia |  | Silicate |  | Hydrogel |  |  |
|---|---|---|---|---|---|---|---|---|---|
|  | Rate, cc./min. | Temp., °F. | Rate, cc./min. | Temp., °F. | Rate, cc./min. | Temp., °F. | Temp., °F. | pH | Time of Set, Sec. |
| 8 | 200 | 111 | 430 | 77 | 400 | 100 | 104 | 10.1 | 5.5 |
| 9 | 260 | 95 | 430 | 79 | 400 | 84 | 94 | 9.7 | 4.6 |
| 10 | 400 | 93 | 430 | 78 | 400 | 86 | 96 | 9.6 | 5.0 |
| 11 | 400 | 126 | 430 | 79 | 400 | 111 | 118 | 8.4 | 8.0 |
| 12 | 125 | 120 | 215 | 82 | 200 | 112 | 126 | 8.7 | 2.7 |
| 13 | 370 | 129 | 235 | 85 | 365 | 99 | 122 | 7.9 | 6.0 |

The results of Examples 8 to 13 presented graphically in the attached drawing show the effects of hydrogel pH on the amount of magnesia retained in the finished catalyst and the activity of the catalyst. It is evident that when the hydrogel is prepared at a pH below 9.5, a considerable amount of the original 31% by weight magnesia in the catalyst is lost by reaction with the excess acid in the hydrogel to form soluble salts which are subsequently washed out of the hydrogel. The activity of the range of 8 to 11, the minimum pH of said hydrosol being defined by the expression:

$$pH = \frac{6500 - t}{560}$$

where $t$ is the temperature of calcination of the magnesia in degrees Fahrenheit, effecting gelation of said hydrosol, washing the resulting hydrogel, and drying and calcining the same.

2. A method for preparing a silica-magnesia catalyst, comprising simultaneously combining three separate streams of (1) an acid solution, (2) an alkali metal silicate solution, and (3) an aqueous suspension of magnesia calcined at about 1400° F. to yield a hydrosol hving a pH in the approximate range of 9.5 to 11, effecting gelation of said hydrosol, washing the resulting hydrogel, and drying and calcining the same.

3. A method for preparing a silica-magnesia catalyst in the form of spheroidal particles, comprising simultaneously mixing three separate streams of (1) an acid solution, (2) an alkali metal silicate solution, and (3) an aqueous suspension of calcined magnesia to yield a hydrosol having a pH in the range of 8 to 11, the minimum pH being defined by the expression:

$$pH = \frac{6500-t}{560}$$

where $t$ is the temperature of calcination of the magnesia in degrees Fahrenheit, conducting the resulting hydrosol in the form of spheroidal globules into an oil medium wherein the globules set to hydrogel, passing the resulting hydrogel particles into an underlying water layer, sluicing the hydrogel particles from said water layer, base-exchanging, water-washing, drying and calcining the same.

4. A method for preparing a silica-magnesia catalyst, comprising simultaneously combining three separate streams of (1) a mineral acid solution, (2) a sodium silicate solution, and (3) an aqueous suspension of calcined magnesia to yield an alkaline hydrosol having a pH in the range of 8 to 11, the minimum pH of said hydrosol being defined by the expression:

$$pH = \frac{6500-t}{560}$$

where $t$ is the temperature of calcination of the magnesia in degrees Fahrenheit, effecting gelation of said hydrosol, washing the resulting hydrogel, and drying and calcining the same.

5. A method for preparing a silica-magnesia catalyst, comprising simultaneously combining three separate streams of (1) an acid salt solution, (2) an alkali metal silicate solution, and (3) an aqueous suspension of calcined magnesia to yield an alkaline hydrosol having a pH in the range of 8 to 11, the minimum pH of said hydrosol being defined by the expression:

$$pH = \frac{6500-t}{560}$$

where $t$ is the temperature of calcination of the magnesia in degrees Fahrenheit, effecting gelation of said hydrosol, washing the resulting hydrogel, and drying and calcining the same.

6. A method for preparing a silica-magnesia catalyst, comprising simultaneously combining three separate streams of (1) an acid solution, (2) an alkali metal silicate solution, and (3) an aqueous suspension of calcined magnesia to yield an alkaline hydrosol having a pH in the range of 8 to 11, the minimum pH of said hydrosol being defined by the expression:

$$pH = \frac{6500-t}{560}$$

where $t$ is the temperature of calcination of the magnesia in degrees Fahrenheit, effecting gelation of said hydrosol, subjecting the resulting hydrogel to hydrothermal treatment, base-exchanging the treated hydrogel, water-washing the base-exchanged hydrogel, and drying and calcining the same.

7. A method for preparing a silica-magnesia catalyst, comprising simultaneously combining three separate streams of (1) an acid solution, (2) an alkali metal silicate solution, and (3) an aqueous suspension of calcined magnesia and finely pulverized silica-magnesia gel to yield an alkaline hydrosol having a pH in the range of 8 to 11, the minimum pH of said hydrosol being defined by the expression:

$$pH = \frac{6500-t}{560}$$

where $t$ is the temperature of calcination of the magnesia in degrees Fahrenheit, effecting gelation of said hydrosol, washing the resulting hydrogel, and drying and calcining the same.

8. A method for preparing a silica-magnesia catalyst in the form of spheroidal particles, comprising simultaneously mixing three separate streams of (1) an acidic solution, (2) an alkali metal silicate solution, and (3) an aqueous suspension of calcined magnesia to yield a hydrosol having a pH in the range of 8 to 11, the minimum pH being defined by the expression:

$$pH = \frac{6500-t}{560}$$

where $t$ is the temperature of calcination of the magnesia in degrees Fahrenheit, conducting the resulting hydrosol in the form of spheroidal globules into a water-immiscible medium wherein the globules set to hydrogel, removing the resulting spheroidal hydrogel particles from said medium, washing, drying, and calcining the same.

References Cited in the file of this patent

UNITED STATES PATENTS

| Number | Name | Date |
|---|---|---|
| 2,432,634 | Thomas | Dec. 16, 1947 |
| 2,506,316 | Pierce | May 2, 1950 |
| 2,551,014 | Kimberlin et al. | May 1, 1951 |
| 2,551,015 | Kimberlin et al. | May 1, 1951 |
| 2,565,627 | Pryor | Aug. 28, 1951 |
| 2,698,330 | Fugate et al. | Dec. 28, 1954 |